UNITED STATES PATENT OFFICE.

ELWOOD D. MOORE, OF NEW YORK, N. Y., ASSIGNOR TO DERNELL POTATO PRODUCTS CO., OF CHICAGO, ILLINOIS, A CORPORATION OF DELAWARE.

METHOD OF REMOVING GREASE FROM FRIED FOOD PRODUCTS.

1,265,236.  Specification of Letters Patent.  Patented May 7, 1918.

No Drawing.  Application filed March 16, 1917. Serial No. 155,335.

*To all whom it may concern:*

Be it known that I, ELWOOD D. MOORE, a citizen of the United States, residing at New York, in the county of New York and State of New York, have invented certain new and useful Improvements in Methods of Removing Grease from Fried Food Products, of which the following is a specification.

This invention relates to a method for removing surface or excess grease from fried food products. It has been proposed to remove grease including the absorbed grease from fried food products by treating them with ether or benzene to dissolve the grease and then evaporate the solvent. This process, however, is objectionable because it is difficult if not impossible to remove all traces of the solvent and furthermore the fried food product degreased in this manner loses the desirable fried flavor.

It is one of the principal objects of this invention to provide a method for treating fried food products to remove the excess or surface grease only, whereby the unpalatable features of the greasy food are overcome without destroying the fried flavor. It is a further object to control the amount of grease which is left on the food product, that is to say, a food product can be obtained by this method having more or less or no surface grease thereon, as desired. Other objects will be apparent from the following description of my method.

In practising my method, the raw food product in any desired form, which for example may be potatoes, whole or cut in any preferred shape, is first placed in a porous receptacle such as a wire basket. In the case of potatoes, the basket with the potatoes therein is immersed in cold water until the potatoes become brittle, but this step is not necessary with all food products. The receptacle with the food product which it contains is then placed in cooking oil or grease at a proper temperature, which for potatoes may be about 340° F. and removed when the food has become cooked. The receptacle is next placed in a centrifuge or other machine for moving the receptacle rapidly in a non-rectilinear path, whereby an unrestrained force is set up which removes the surface grease from the fried food product, but without in any way injuring or changing the shape of the same. In order to facilitate this removal of the grease a stream of hot air may be played over the food to maintain the grease fluent.

Some of the grease will be evaporated, although the major portion will be carried off by the force mentioned above. I have found that good results are obtained by delivering air under two pounds pressure and 300° F. although my method is not limited to this pressure or temperature. After the product has been acted upon in this manner the basket is taken from the machine and the resulting food product is one free from surface grease. It will be apparent that the condition of the food product, that is whether it is absolutely free from surface grease or more or less remains thereon depends on any one of three factors or combination of them. Thus the extent and rate of degreasing the food may be controlled by the speed of the receptacle, the temperature of the air and the time that the food is subjected to this treatment. The pressure of the air is a minor factor, as far as controlling the degreasing operation is concerned, although it will be obvious that the greater the air pressure, the more air will be delivered over the food and the more grease evaporated. The air may be heated in any desired manner and delivered under pressure by a blower or air pump or in any other preferred way.

It will be observed that the food product is delivered hot because of the hot air which is played over the same. Furthermore the grease is removed very quickly and with a minimum of labor, and the apparatus for carrying out the method is very simple and easily secured.

Although I have described the particular apparatus for practising my method, it is obvious that many forms of devices might be used, the only limitations on the apparatus for degreasing the food being that it shall set up a force to remove the grease from the product and preferably that the grease on the food shall be kept in a substantially fluid state.

Having described the invention, what is claimed and desired to be secured by Letters Patent is:

1. The method of treating a fried food product to remove grease therefrom, which consists in subjecting the fried food product to a heat sufficient to render the grease fluent and simultaneously subjecting the grease to an unrestrained force which is greater than the adhesion between the grease and the food product.

2. The method of treating a fried food product to remove grease therefrom, which consists in subjecting the fried food product to the action of hot air and simultaneously moving the food product in a curved path at a sufficient velocity to cause the grease to fly off from the food product.

3. The method of removing grease from fried potato which consists in simultaneously subjecting the potato to hot air and moving the same in a circular path at a sufficient angular velocity to cause the grease to fly off from the potato.

4. The method of treating food substances to remove a constituent therefrom, which consists in subjecting the substance to the combined and simultaneous action of a dry heating agent, and restrained centrifugal force.

5. The method of treating a greasy food product to remove grease therefrom, which consists in subjecting the food product to air at a temperature of about 300 degrees Fahrenheit and simultaneously subjecting the grease to an unrestrained force which is greater than the adhesion between the grease and the food product.

In testimony whereof I affix my signature.

ELWOOD D. MOORE.